United States Patent [19]

Yamamoto

[11] Patent Number: 5,566,888
[45] Date of Patent: Oct. 22, 1996

[54] METHOD AND AN APPARATUS FOR RECYCLING A RESIN COMPONENT

[75] Inventor: Hiroshi Yamamoto, Oota, Japan

[73] Assignee: Fuji Jukogyo Kabushiki Kaisha, Tokyo, Japan

[21] Appl. No.: 243,148

[22] Filed: May 16, 1994

[30] Foreign Application Priority Data

| May 21, 1993 | [JP] | Japan | 5-120121 |
| May 21, 1993 | [JP] | Japan | 5-120122 |
| May 21, 1993 | [JP] | Japan | 5-120123 |

[51] Int. Cl.⁶ .......................... B02C 19/12; B02C 23/08
[52] U.S. Cl. .................. 241/3; 241/23; 241/24.28; 241/29; 241/157; 241/DIG. 38
[58] Field of Search .................... 241/3, 23, 24, 241/29, 152.2, DIG 38, 24.28, 157

[56] References Cited

U.S. PATENT DOCUMENTS

| 4,968,463 | 11/1990 | Levasseur | 264/40.1 |
| 5,183,212 | 2/1993 | Boo et al. | 241/17 |
| 5,279,465 | 1/1994 | Stroppiana | 241/29 |
| 5,297,741 | 3/1994 | Zurn et al. | 241/14 |
| 5,323,971 | 6/1994 | Nishibori et al. | 241/3 |
| 5,443,772 | 8/1995 | Inoue et al. | 241/23 X |

Primary Examiner—John M. Husar
Attorney, Agent, or Firm—Beveridge, DeGrandi, Weilacher & Young, L.L.P.

[57] ABSTRACT

A coated or plated resin component is roughly ground to prepare a roughly-ground form. The roughly-ground form is heated and extruded to prepare an extruded strand or film composed of a base resin and coating film pieces or deposit pieces therein. The extruded form is rolled and drawn to prepare a rolled film. The rolled film is pulverized to prepare pulverized form which is separated into a base resin component and a coating film or deposit piece component. Instead of extruding step, the roughly-ground form is blown by an inflation method to prepare a blown tube composed of a base resin and coating film piece or deposit pieces therein.

11 Claims, 14 Drawing Sheets

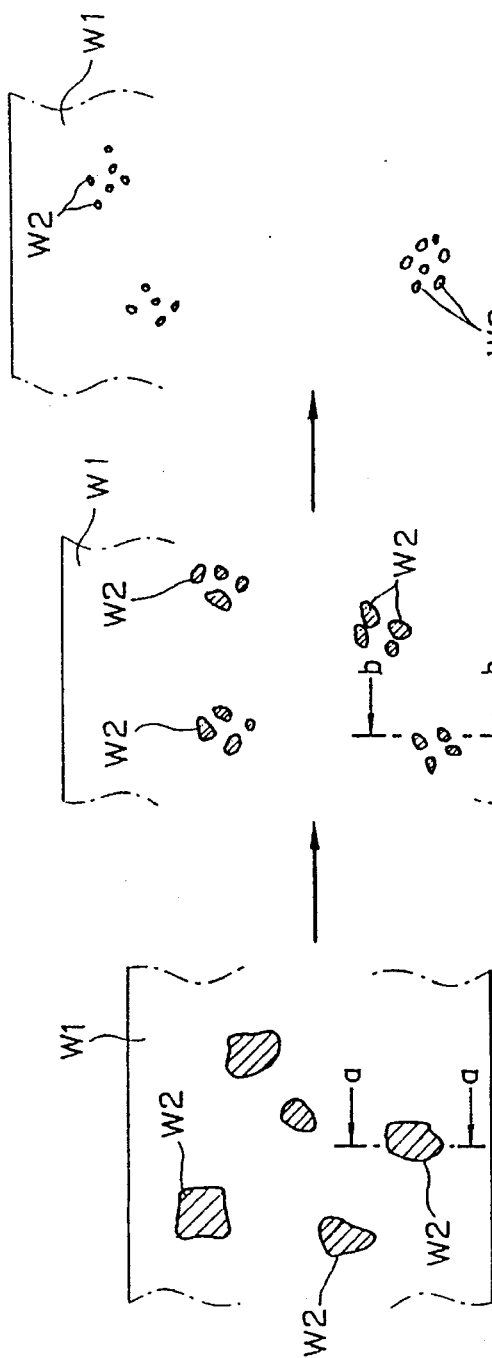
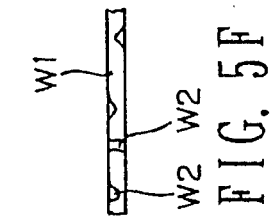
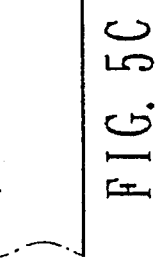
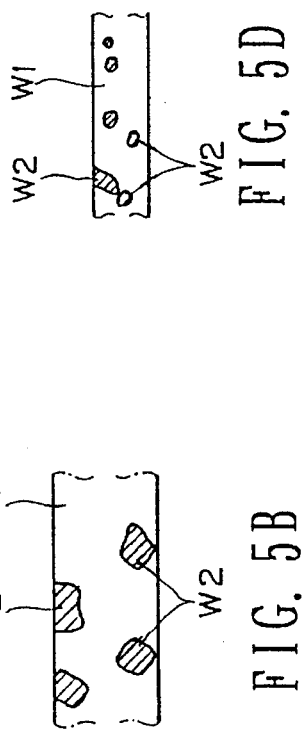
FIG. 5A  FIG. 5B  FIG. 5C  FIG. 5D  FIG. 5E  FIG. 5F

METHOD AND AN APPARATUS FOR RECYCLING A RESIN COMPONENT

BACKGROUND OF THE INVENTION

1. Field of the Invention

The present invention relates to a method and an apparatus for recycling a resin component, especially a coated or plated resin component.

2. Description of the Related Art

Due to the increasing interest in the environmental issues and reutilization of resources, scrapped car recycling has recently come to attract attention in the field of the car industry. In general, about 75% of the material of an automobile by weight is reduced to scrap iron and nonferrous metals for reuse by removing, and the remainder or about 25% is disposed as industrial waste. The waste contains about 30% of resin material by weight, along with fibers, rubber, and etc.

Typically, the material of a resin component, e.g., the skin of a bumper, is composed of a coating film W4 formed on a base W3 of a thermoplastic resin such as polypropylene, as shown in the sectional view of FIG. 6. Available resins for the material of the coating film W4 include thermosetting resins, such as amino polyester, amino acrylic, polyester-urethane and acryl-urethane resins. Being liquid before making, these resins can be given a crosslinked structure by baking finish. Since this structure is firm and tight, a coated resin bumper is excellent in chemical resistance, heat resistance, scuff resistance, weathe-proof and surface gloss.

If this recycled material is obtained by grinding and pelletizing this bumper without removing coating film pieces are mixed with the polypropylene material. In molding this material having the film pieces therein, the film pieces lower the fluidity of the molten resin, and subject the resulting molded article to molding faults, such as burning, weld-marks, bubbles, etc. The coating film pieces which are exposed on the surface of the molded article mar the external surface of the final product.

Since there are hardly any interactions between the coating film pieces and the polypropylene resin for use as a base resin, the film pieces rather constitute foreign matter, which worsens the mechanical properties of the molded article. For example, the impact strength of the recycled polypropylene material contaminatedi with the coating film pieces therein is about 80% of that of virgin polypropylene.

Accordingly, recycling the coated resin component requires removal of the coating film.

As described in Automotive Technology Vol. 46, No. 5, pp. 3–9, 1992 (compiled and issued by Japan Automotive Technology Association), methods of removing the coating film are classified into three categories, mechanical, physical, and chemical methods.

The mechanical removing methods include the shot blasting method, screen-mesh method and etc. In the shot blasting method, the coating film is removed by blowing abrasive powder against the surface by compressed air. In the screen-mesh method, a coated resin component is roughly ground, pulverized, fused, and then filtered through a mesh, whereby unfused coating film pieces are removed.

In the shot blasting method, the coating film is removed by friction, impact and etc., so that this method is highly safe from the toxicological or ecological point of view. According to this method, however, the removal of the coating film requires a long treatment time and its efficiency is low, and it is difficult to treat curved portions of the component, in particular. In the screen-mesh method, on the other hand, the coating film pieces are removed by filtering, so that this method also has high ecological safety. Also in this case, however, the treatment time is long, and the coating film removal efficiency is not satisfactory.

According to the physical removing methods, the coating film is removed by means of halogen-based solvents or various organic solvents, taking advantage of the infiltration of the solvent into the interface between the coating film and the base material and swelling of the film caused by the solvent. These methods, however, are poor in ecological safety and relatively low in coating film removal efficiency and treatment capability, and may possibly cause change of properties of the base material.

Since the mechanical and physical coating film removing methods are low in coating film removal efficiency, final products made from molded articles by these methods have poor external surface and mechanical properties, and the range of their application is limited.

The chemical removing methods include the organic-salt method in which the coating film is chemically decomposed and removed by cutting ether bonds in the vicinity of crosslinking points of the coating film resin by means of, for example, an ethanol mixed solution which contains organic salt.

This method has a problem of secondary treatment, such as waste water treatment, and its treatment efficiency is low. According to this method, moreover, the removal of a deposit from a plated resin product is subject to low efficiency and insufficient treatment capability, and it is hard to obtain high-quality recycled resin components.

SUMMARY OF THE INVENTION

The object of the present invention is to provide a method and an apparatus for recycling a resin component, excellent in coating film or deposit removal efficiency, ecological safety, and treatment capability, and capable of producing high-quality recycled resin components.

In order to achieve the above object, in an aspect of the present invention, there is provided a resin component recycling method comprising the steps of: roughly grinding a coated or plated resin component, thereby preparing a roughly-ground form; heating and extruding the roughly-ground form by means of an extruder, thereby preparing an extruded strand or film composed of a base resin and coating film pieces or deposit pieces therein; rolling and drawing the extruded form, thereby preparing a rolled film; a pulverizing process for pulverizing the rolled film, thereby preparing a pulverized form; and separating the pulverized form into a base resin component and a coating film or deposit piece component.

According to the resin component recycling method described above, the coated or plated resin component is roughly ground, the roughly-ground form is extruded into the strand or film by means of the extruder, and the extruded form is rolled and drawn so that the coating film pieces or deposit pieces are crushed and pulverized, whereby separation between the base resin and the coating film pieces or deposit pieces is accelerated. According to this method, the filter mesh of the extruder can be increased in size, so that the productivity is improved, and the pulverization in the next stage is facilitated, ensuring the production of the pulverized form without any junction between the base resin and the coating film pieces or deposit pieces. Thus, a high-quality recycled resin component can be obtained with a very high coating film or deposit removal efficiency. Unlike the conventional coating film or deposit removing methods, moreover, this method requires no use of a solvent or the like, so that it can enjoy effects or advantages peculiar to the present invention, such as high toxicological or ecological safety, good treatment capability, etc. In consequence, the method of the invention largely contributes to the recycling of coated or plated resin components in various fields.

In another aspect of the invention, there is provided a resin component recycling method comprising the steps of: roughly grinding a coated or plated resin component, thereby preparing a roughly-ground form; blowing the roughly-ground form by the inflation method, thereby preparing a blown tube composed of a base resin and coating film pieces or deposit pieces therein; rolling and drawing the blown form, thereby preparing a rolled film; pulverizing the rolled film, thereby preparing a pulverized form; and separating the pulverized form into a base resin component and a coating film or deposit piece component.

According to the resin component recycling method, the coated or plated resin component is roughly ground, the roughly-ground form is previously blown into the thin-walled blown tube by means of a blower, and the blown tube is rolled and drawn so that the coating film pieces or deposit pieces are crushed and pulverized, whereby separation between the base resin and the coating film pieces or deposit pieces is accelerated. According to this method, the pulverization in the next stage is facilitated, ensuring the production of the pulverized form without any junction between the base resin and the coating film pieces or deposit pieces. Thus, a high-quality recycled resin component can be obtained with a very high coating film or deposit removal efficiency. Unlike the conventional coating film or deposit removing methods, moreover, this method requires no use of a solvent or the like, so that it can enjoy effects or advantages peculiar to the present invention, such as high toxicological or ecological safety, good treatment capability, etc. In consequence, this method of the invention largely contributes to the recycling of coated or plated resin components in various fields.

BRIEF DESCRIPTION OF THE DRAWINGS

FIGS. 5A to 5F are diagrams for illustrating various states of coating film pieces included in a base resin in a rolling/drawing process;

DETAILED DESCRIPTION OF THE PREFERRED EMBODIMENTS

Preferred embodiments of the present invention will become understood from the following detailed description referring to the accompanying drawings.

The following is a description of a method and an apparatus for recycling a resin component according to the embodiments of the present invention, which is applied to the case where the component is a coated resin bumper which is a relatively bulkier component than those of other automotive resin components.

Figure 1:
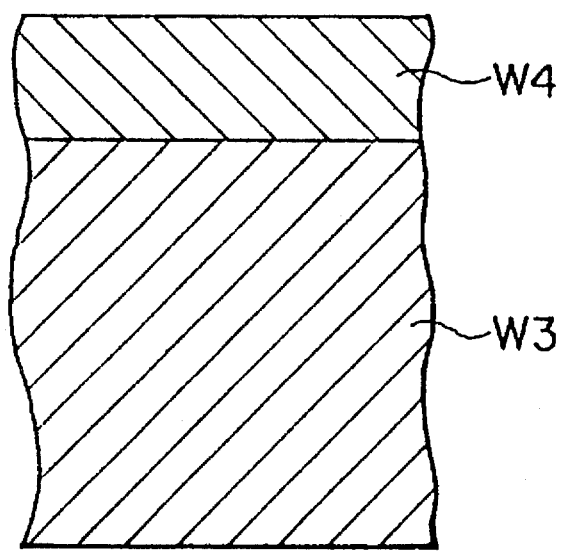
FIG. 1 is a sectional view of a coated bumper.
Figure 2:
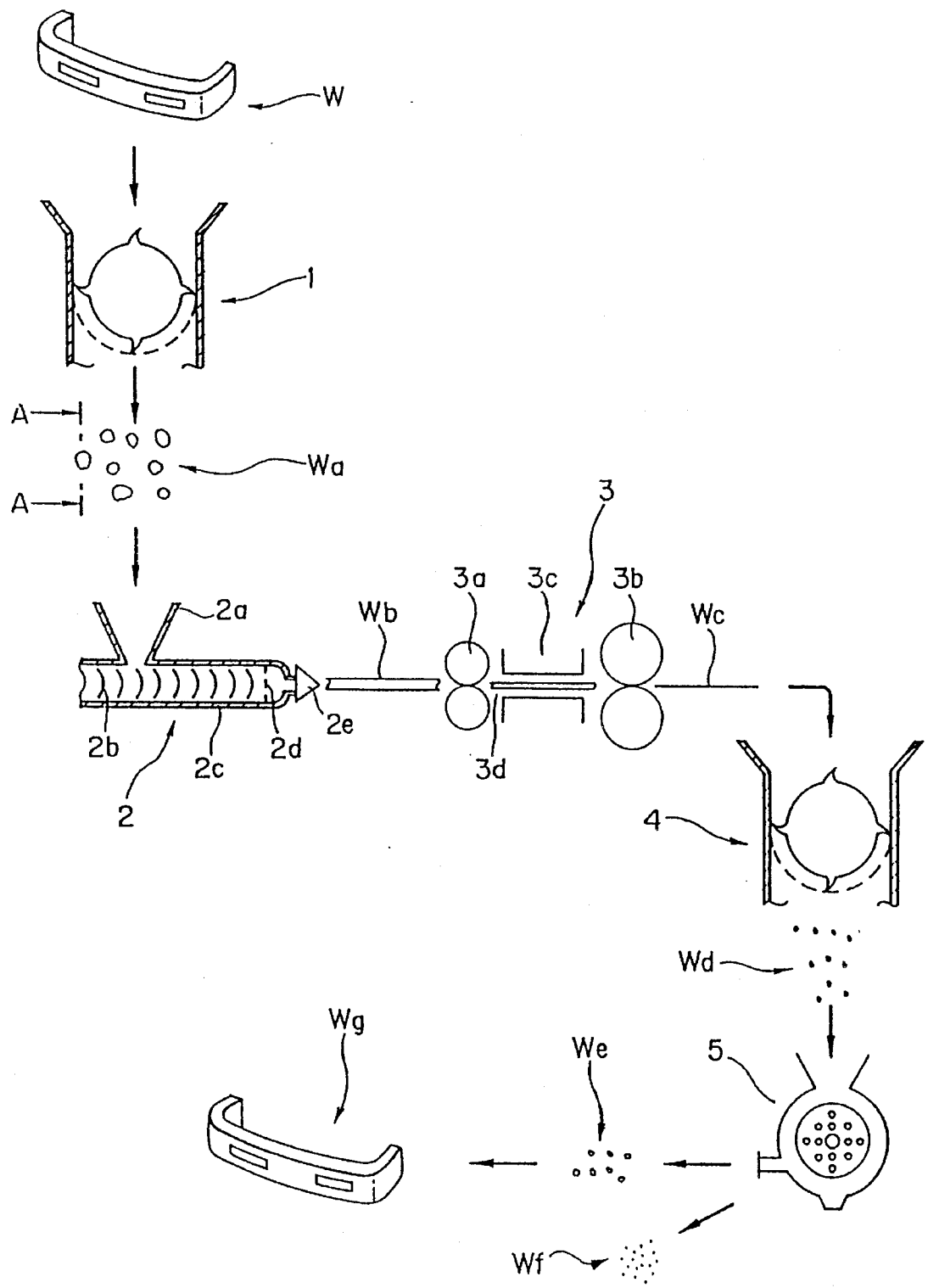
FIG. 2 is a schematic view for illustrating a resin component recycling method and apparatus according to a first embodiment of the present invention.
Figure 3:
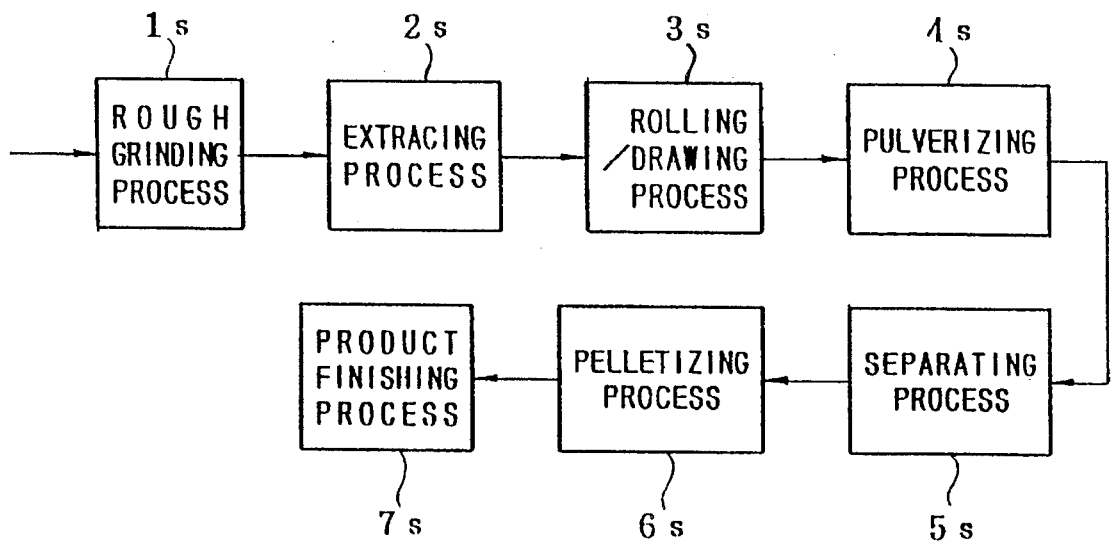
FIG. 3 is a flow chart showing various processes of the method.

FIG. 2 is a schematic view for illustrating the resin component recycling method and apparatus according to the first embodiment, and FIG. 3 is a flow chart showing various processes of the method.

In FIG. 2, symbol W designates a coated resin bumper removed and recovered from a scrapped car or the like and cleared of metallic parts. The bumper W is composed of a thermoplastic base of, e.g., polypropylene and a thermosetting resin coating film of amino polyester, amino acrylic, polyester-urethane, or acryl-urethane resin formed thereon.

In FIG. 2, numeral 1 denotes a rough grinder, such as a cutter mill with about 40-mm screen meshes, for grinding the coated resin bumper W, thereby preparing roughly-ground fragments Wa.

The roughly-ground fragments Wa prepared by means of the rough grinder 1 are supplied to a hopper 2a of an extruder 2. As a screw 2b of the extruder 2 rotates, the fragments Wa put in the hopper 2a advance in the barrel 2c and are heated by means of a band heater or the like. As the ground fragments Wa advance in the barrel 2c in this manner, the fragments Wa are softened, blended, and extruded through a die 2e such as a porous die or T-die, whereupon an extruded strand or film Wb is obtained. A filter mesh 2d is attached to the distal end of the barrel 2c. The mesh 2d serves to filtrate foreign matter, restrict a flow to the die 2e, thereby increasing the pressure in the barrel 2c, increase the degree of mixing, and rectify the flow.

A rolling/drawing unit 3 is provided on the lower-course side of the extruder 2. The unit 3 rolls and draws the extruded form Wb which contains the thermoplastic base resin and thermosetting resin film pieces mixed therewith, and is extruded by means of the extruder 2. The rolling/drawing unit 3 comprises a pair of upper-course rollers 3a arranged on its upper-course side, a pair of lower-course rollers 3b arranged on its lower-course side and rotatable at a higher peripheral speed than the upper-course rollers 3a, and heating means 3c interposed between the rollers 3a and 3b. The extruded strand or film Wb temperature such that its base resin is plasticized, and is drawn and rolled to form a rolled film Wc.

In FIG. 2, numeral 4 denotes a pulverizer which pulverizes the rolled film produced by the rolling/drawing unit 3, thereby obtaining pulverized powder Wd. The powder Wd produced by the pulverizer 4 is divided into two portions, a portion having so far constituted the base resin and a portion Wf having so far constituted the coating film, by means of a separator 5, such as a pin mill or specific-gravity separator. All the pulverized powder except the film constituting portion is fused to form pellets We. Thus, a resin product, such as a bumper, can be reproduced.

Referring to the flow chart of FIG. 3, the resin component recycling method, which uses the recycling apparatus constructed in this manner, will be described.

Figure 4:
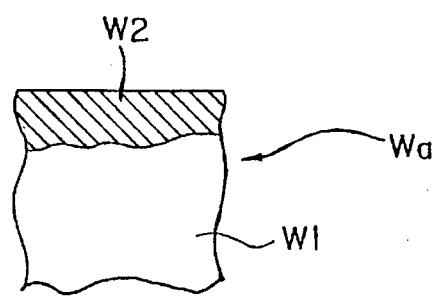
FIG. 4 is a sectional view of a roughly-ground fragment obtained by grinding a resin component.

The recovered coated resin bumper W, cleared of the metallic parts, is ground into the roughly-ground fragments Wa by means of the rough grinder 1 in a rough grinding process 1s. As shown in the enlarged sectional view of FIG. 4 taken along line A—A of FIG. 2, thermosetting resin film pieces W2 adhere to the thermoplastic base or base resin W1.

The roughly-ground fragments Wa, ground in the rough grinding process 1s, are thrown into the hopper 2a of the extruder 2 in an extruding process 2s in the next stage. As the screw 2b rotates, the fragments Wa in the hopper 2a are heated. As the fragments Wa advance in the barrel 2c, the roughly-ground fragments Wa are softened and blended into a fluid state, and the resulting fluid is continuously extruded through the die 2e at the distal end of the extruder 2, thus forming the extruded strand or film Wb.

In the extruded form Wb, as shown in the plan view of FIG. 5A and the sectional view of FIG. 5B taken along line a—a of FIG. 5A, the coating film pieces W2 of a relatively large size are included in the base resin W1.

In a rolling/drawing process 3s in the next stage, the extruded form Wb is rolled and drawn by means of the rolling/drawing unit 3.

Thus, the extruded form Wb, extruded from the extruder 2, is rolled by means of the upper- and lower-course rollers 3a and 3b of the rolling/drawing unit 3, and is heated to a temperature lower than the melting point of the base resin W1 by the heating means 3c, so that the form is plasticized. Between the upper- and lower-course rollers 3a and 3b, moreover, the extruded form Wb is drawn in its flowing direction in accordance with the difference between the respective peripheral speeds of the rollers 3a and 3b.

In the extruded form Wb in a position 3d on the lower-course side of the upper-course rollers 3a, as shown in the plan view of FIG. 5C and the sectional view of FIG. 5D taken along line b—b of FIG. 5C, the base resin W1 is rolled by means of the rollers 3a, so that the coating film pieces W2 in the resin W1 is crushed and ground. Moreover, the base resin W1, which is formed of the thermoplastic resin, is softened to become fluid by heating, so that it can be easily drawn. Formed of the thermosetting resin, on the other hand, the film pieces W2 cannot be drawn. Accordingly, the film pieces W2 cannot follow up the extension of the base resin W1, so that a crack is liable to be caused between the two, thus facilitating their separation.

Furthermore, the drawing lowers the strength of the base resin W1 with respect to the direction perpendicular to the drawing direction, and makes the resin W1 easily tearable.

The extruded form Wb drawn between the upper- and lower-course rollers 3a and 3b is rolled by means of the lower-course rollers 3b, so that the coating film pieces W2 in its base resin W1 are crushed and further finely ground, thus forming a drawn film Wc, as shown in the plan view of FIG. 5E and the sectional view of FIG. 5F.

The drawn film Wc, formed of the base resin W1 containing the finely ground film pieces W2, is pulverized to the diameter of about, for example, 20 to 30 μm by means of the pulverizer 4 in a pulverizing process 4s. Prior to this pulverization, the coating film pieces W2 are reduced beforehand into fine pieces in the rolling/drawing process 3s, so that a crack or tear is liable to be caused between the base resin W1 and the film pieces W2, and the resin W1 is lowered in strength and easily tearable. Thus, the pulverized powder Wd can be prepared very efficiently without linkage between the base resin W1 and the film pieces W2 and with the powder of resin W1 mixed with the powder of the film pieces W2.

The pulverized powder Wd obtained in the pulverizing process 4s is separated into the two portions, the portion having so far constituted the base of the bumper W and the portion Wf for the coating film pieces W2 having so far constituted the coating film, by means of the fine separator 5, such as a pin mill or specific-gravity separator. Prior to this separation, the pulverized powder Wd is obtained without any junction between the base resin W1 and the film pieces W2. Thus, the separation can be achieved very satisfactorily.

The pulverized powder Wd, cleared of the portion Wf for the coating film pieces W2 by separation, is molded into the high-purity pellets We which hardly contain the film pieces W2 in a pelletizing process 6s in the next stage. Subsequently, a recycled product Wg is obtained in a product finishing process 7s.

Since the recycled product Wg is formed of the pellets We which are fully cleared of the coating film pieces W2, it can be a high-quality product based on a virgin material which are free from defects in external appearance, such as weld-marks, bubbles and etc., and enjoys high impact strength.

In the embodiment described above, the extruded form Wb delivered from the extruder 2 is rolled and drawn by the single rolling/drawing unit 3, whereby the rolled film Wc is obtained. Alternatively, however, the rolled film Wc may be obtained by rolling and drawing the extruded form Wb a suitable number of times with use of a plurality of rolling/drawing units 3 arranged adjacent to one another.

Figure 6:
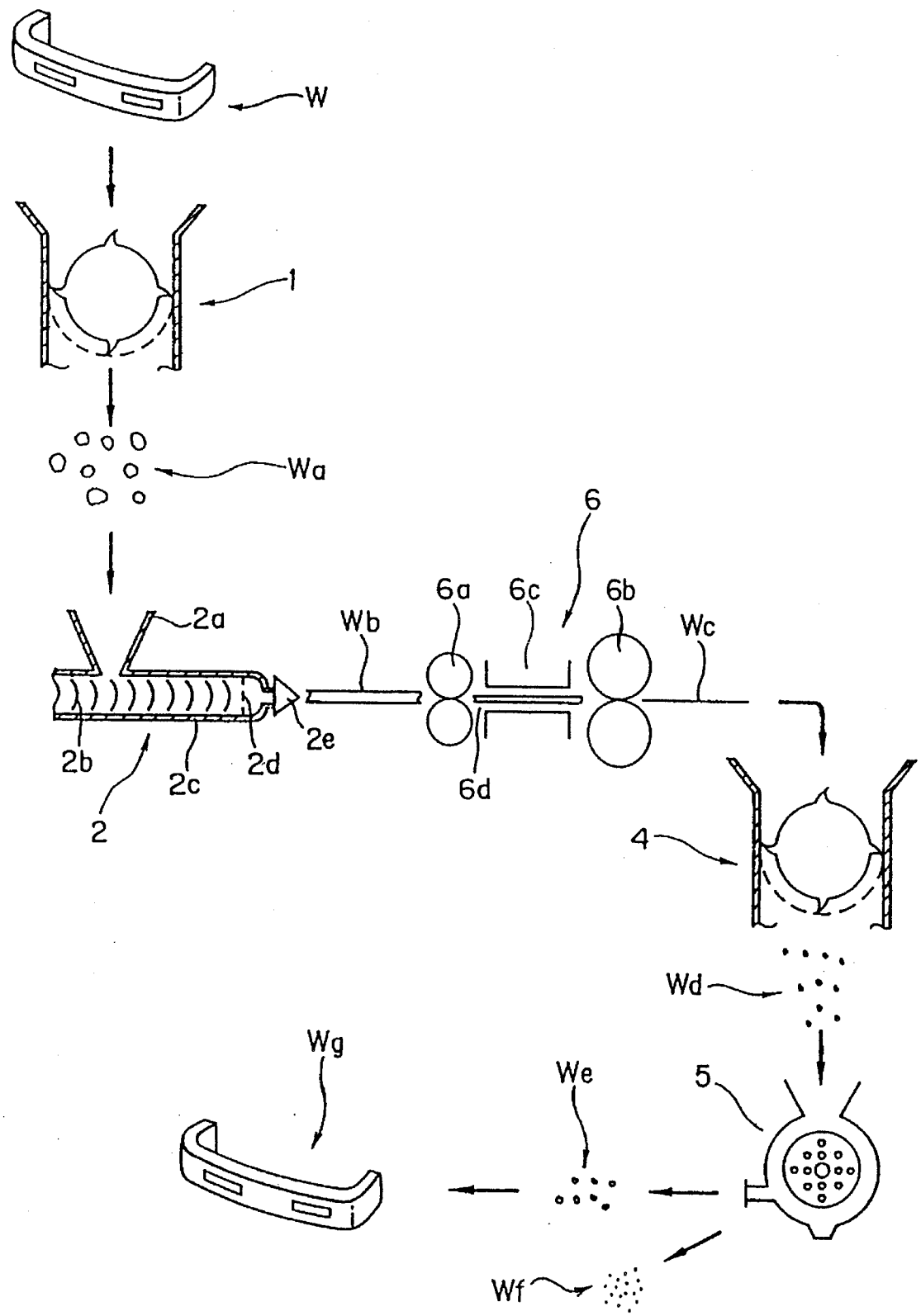
FIG. 6 is a schematic view for illustrating a resin component recycling method and apparatus according to a modification of the first embodiment of the invention.

FIG. 6 is a schematic view showing an outline of a modification of the first embodiment. Like reference numerals refer to like portions in FIGS. 2 and 6, and detailed description of those portions is omitted. In FIG. 6, numeral 6 denotes a rolling/drawing unit which prepares a rolled film Wc by rolling and drawing an extruded strand or film Wb extruded by means of an extruder 2.

The rolling/drawing unit 6, which is used in a rolling/drawing process 3s, comprises a pair of upper-course rollers 6a arranged on its upper-course side, a pair of lower-course rollers 6b arranged on its lower-course side, and cooling means 6c interposed between the rollers 6a and 6b.

In the rolling/drawing unit 6, the upper-course rollers 6a roll the extruded strand or film Wb obtained in an extruding process 2s, thereby crushing coating film pieces W2, and cooling means 6c cools the film pieces W2 to a temperature lower than their stiffening temperature, thereby subjecting the pieces W2 to brittle fracture. The extruded form Wb is drawn in accordance with the difference between the respective peripheral speeds of the upper- and lower-course rollers 6a and 6b, so that a crack is liable to be caused between a base resin W1 and the film pieces W2. The extruded form Wb drawn in this manner is rolled by means of the lower-course rollers 6b, and the coating film pieces W2 in the base resin W1 are finely crushed to form a drawn film Wc.

Prior to pulverization of the drawn film Wc by means of the pulverizer 4 in a pulverizing process 4s in the next stage, the coating film pieces W2 are subjected beforehand to brittle fracture in the rolling/drawing process 3s, so that a crack or tear is liable to be caused at the junction between the base resin W1 and the film pieces W2, and the resin W1 is easily tearable. Thus, the pulverized powder Wd can be prepared very efficiently without adhesion of the film pieces W2 to the base resin W1, and separation can be achieved satisfactorily in a fine separation process 5s. As in the case of the foregoing embodiment, therefore, a high-quality recycled product Wg can be obtained.

Also in this modification, the rolled film Wc may be obtained by rolling and drawing the extruded form Wb a suitable number of times with a plurality of rolling/drawing units 6 arranged adjacent to one another.

According to the foregoing embodiment, moreover, the extruded form Wb is heated or cooled in the rolling/drawing process 3s. Alternatively, however, the apparatus and control may be simplified by omitting the heating or cooling operation.

The rolled film Wc obtained in the rolling/drawing process 3s is wound in a roll without being immediately pulverized in the pulverizing process 4s, so that it can be stored in a roll or in layers. Thus, the volume of the storage space for the material can be made smaller than in the case where the material is stored in a ground form or pellets. For example, the storage volume can be reduced to ½ or ⅓ of that for the ground or pulverized form.

Although the case of recovering and recycling the coated resin bumper has been described above, the method and apparatus of the present invention are not limited to this product, and may be also applied to any other suitable resin products, such as thermoplastic resin products coated with a thermosetting resin or plated ones.

More specifically, a plated resin component is roughly ground by the rough grinder in the rough grinding process, whereby roughly-ground fragments are prepared. These fragments are heated and extruded by means of the extruder 2 in the extruding process 2s, whereupon an extruded strand or film, which is composed of a base resin and deposit pieces therein, is obtained. Then, the extruded form is rolled and drawn into a rolled film by means of the rolling/drawing unit 3 or 6 in the rolling/drawing process 3s, and the rolled form is pulverized by means of the pulverizer 4 in the pulverizing process 4s to prepare pulverized powder. The pulverized powder is cleared of a deposit constituting portion by means of the separator 5 in the separating process 5s, and is pelletized in the pelletizing process 6s. Thus, a recycled product can be obtained in the product finishing process 7s.

Figure 7:
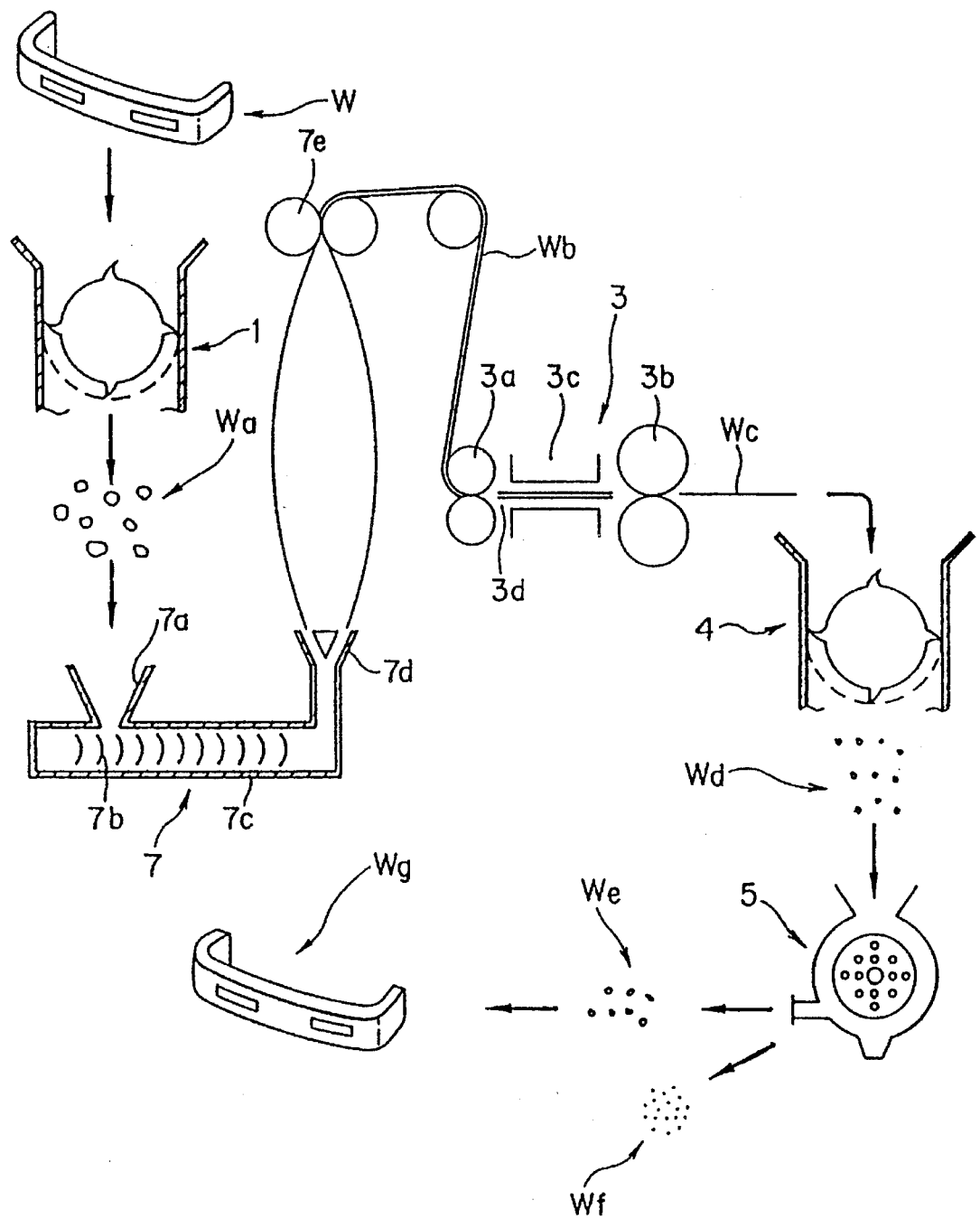
FIG. 7 is a schematic view for illustrating the resin component recycling method and apparatus according to a second embodiment of the invention.
Figure 8:
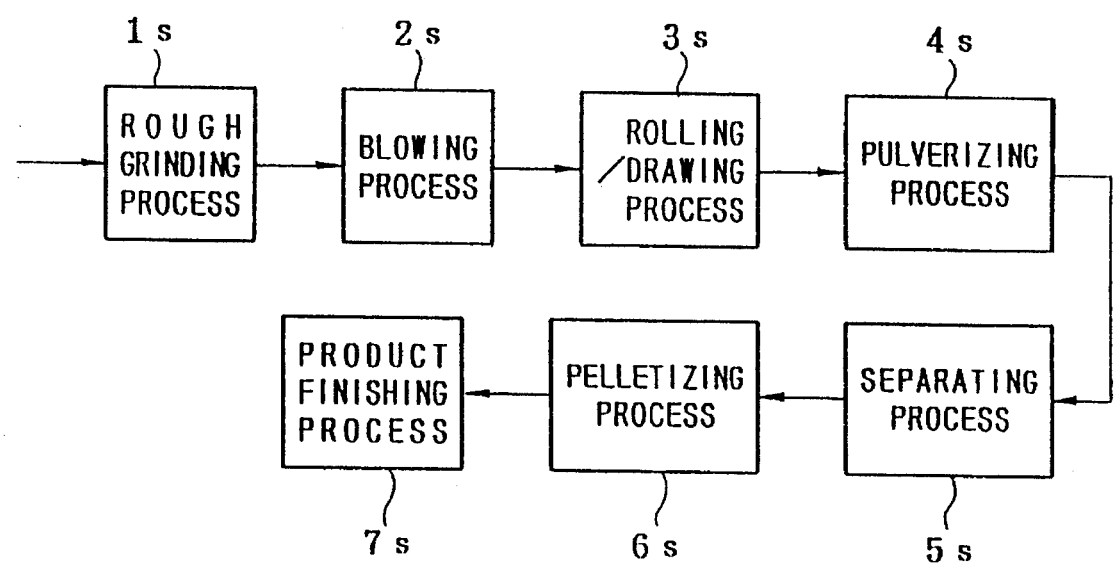
FIG. 8 is a flow chart showing various processes of the method shown in FIG. 7.

FIG. 7 is a schematic view for illustrating the resin component recycling method and apparatus according to a second embodiment of the present invention, and FIG. 8 is a flow chart showing various processes of this method.

In connection with the second embodiment, a description of the same arrangements and functions as in the first embodiment is omitted.

The roughly-ground fragments Wa, prepared by means of a rough grinder 1, are supplied to a hopper 7a of a blower 7. The blower 7 is used to form a blown tube Wb by the inflation method. The fragments Wa in the hopper 7a are advanced in a barrel 7c by rotating a screw 7b, and are heated by means of a band heater or the like. As they advance in the barrel 7c, the roughly-ground fragments Wa are softened and blended, and a thin-walled tube is extruded through an inflation die 7d, such as a crosshead die. The tube is inflated to a predetermined degree with a gas, e.g., air, with its upper end held between a pinch rollers 7e. As the rollers 7e are rotated in this state, the blown tube Wb is produced continuously.

A rolling/drawing unit 3 is provided on the lower-course side of the blower 7. The unit 3 rolls and draws the blown form Wb which contains a thermoplastic base resin and thermosetting resin film pieces mixed therewith, and is prepared by the blower 7. The rolling/drawing unit 3 comprises a pair of upper-course rollers 3a arranged on its upper-course side, a pair of lower-course rollers 3b arranged on its lower-course side and rotatable at a higher peripheral speed than the upper-course rollers 3a, and heating means 3c interposed between the rollers 3a and 3b. The blown form Wb, prepared by means of the blower 7, is heated to a temperature such that its base resin is plasticized, and is drawn and rolled to form a rolled film Wc.

In FIG. 7, numeral 4 denotes a pulverizer which pulverizes the rolled film produced by the rolling/drawing unit 3, thereby obtaining pulverized powder Wd. The powder Wd produced by the pulverizer 4 is divided into two portions, a portion having so far constituted the base resin and a portion Wf having so far constituted the coating film, by a separator 5, such as a pin mill or specific-gravity separator. All the pulverized powder except the film constituting portion is fused to form pellets We. Thus, a resin product, such as a bumper, can be reproduced.

Referring now to the flow chart of FIG. 8, the resin component recycling method, which uses the recycling apparatus constructed in this manner, will be described.

The roughly-ground fragments Wa, ground in a rough grinding process is, are thrown into the hopper 7a of the blower 7 in a blowing process 2s in the next stage. As the screw 7b rotates, the fragments Wa in the hopper 7a are heated. As they advance in the barrel 7c, the roughly-ground fragments Wa are softened and blended into a fluid state, and the resulting fluid is extruded into a thin-walled tube through the inflation die 7d at the distal end of the blower 7, thus forming the blown tube Wb inflated and drawn to the predetermined degree with the introduced air.

In a balloon-shaped peripheral film Wh inflated by means of the blower 7, the coating film pieces W2 of a relatively large size are included in the base resin W1, as shown in the plan view of FIG. 5A and the sectional view of FIG. 5B taken along line a—a of FIG. 5A.

In a rolling/drawing process 3s in the next stage, the blown form Wb, previously drawn thin enough in the blowing process 2s, is further rolled and drawn by means of the rolling/drawing unit 3.

Thus, the blown form Wb, drawn into the tube by the blower 7, is rolled by the upper- and lower-course rollers 3a and 3b of the rolling/drawing unit 3, and is heated to a temperature lower than the melting point of the base resin W1 by the heating means 3c, so that it is plasticized. Between the upper- and lower-course rollers 3a and 3b, moreover, the blown form Wb is drawn in its flowing direction in accordance with the difference between the respective peripheral speeds of the rollers 3a and 3b.

Since the subsequent flow includes the same processes of the first embodiment, a description of those processes is omitted.

Figure 9:
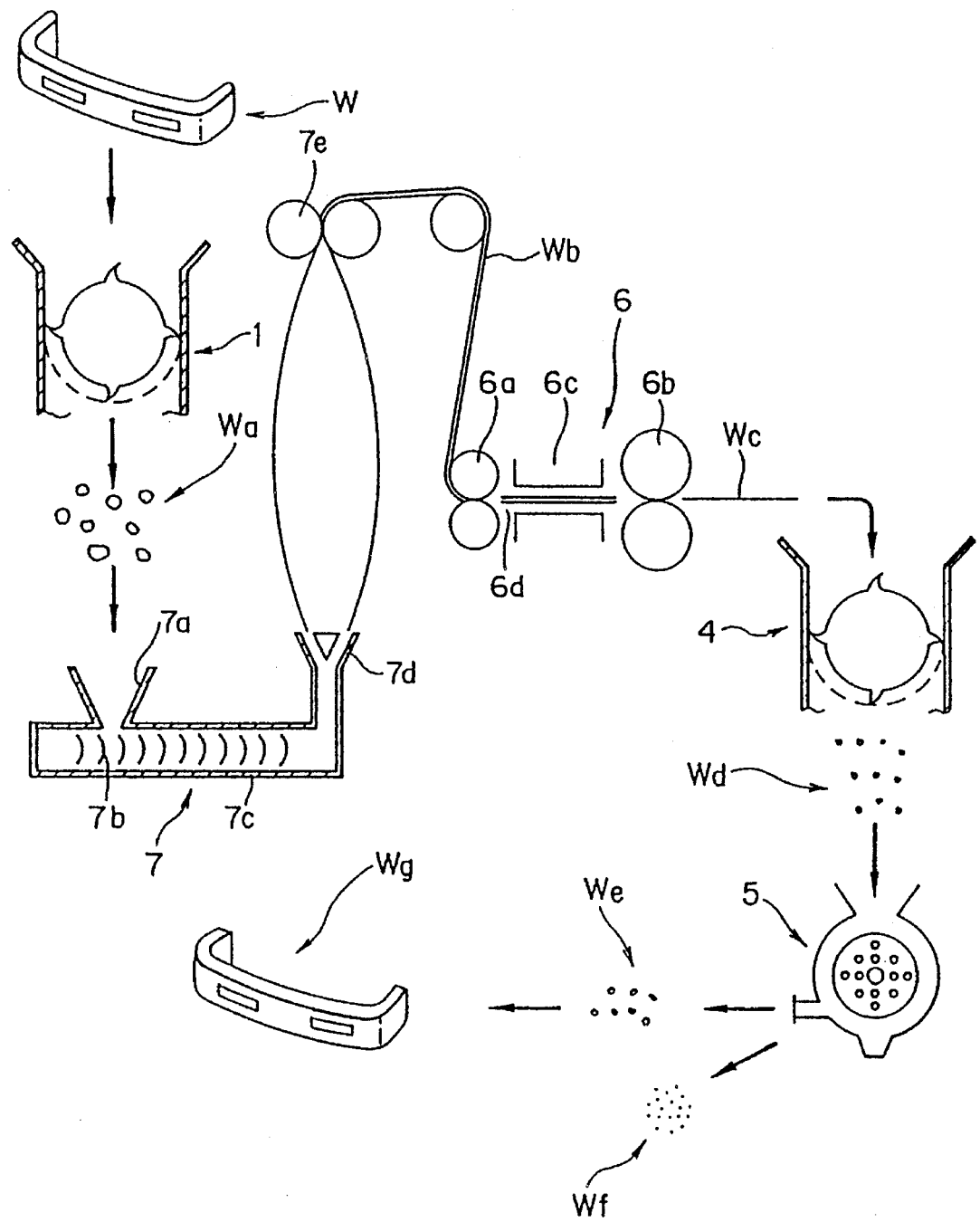
FIG. 9 is a schematic view for illustrating the resin component recycling method and apparatus according to the modification of the second embodiment of the invention.

FIG. 9 is a schematic view showing an outline of a modification of the second embodiment. Like reference numerals refer to like portions in FIGS. 7 and 9, and a detailed description of those portions is omitted. In FIG. 9, numeral 6 denotes a rolling/drawing unit which prepares a rolled film Wc by rolling and drawing a blown tube Wb formed by means of a blower 7.

This rolling/drawing unit 6 is constructed in the same manner as the modification of the first embodiment.

In the rolling/drawing unit 6, first rollers 6a roll the blown tube Wb obtained in a blowing process 2s, thereby crushing coating film pieces W2, and cooling means 6c cools the film pieces W2 to a temperature lower than their stiffening temperature, thereby subjecting the pieces W2 to brittle fracture. The blown form Wb is drawn in accordance with the difference between the respective peripheral speeds of the first and second rollers 6a and 6b, so that a crack is liable to be caused between a base resin W1 and the film pieces W2. The blown form Wb drawn in this manner is rolled by the second rollers 6b, and the coating film pieces W2 in the base resin W1 are finely crushed to form a drawn film Wc.

Since the subsequent processes of operation are executed in the same manner as in the modification of the first embodiment, a description of those processes is omitted.

Although the case of recovering and recycling the coated resin bumper has been described above, the method and apparatus of the present invention are not limited to this product, and may be also applied to any other suitable resin products, such as thermoplastic resin products coated with a thermosetting resin or plated ones.

More specifically, a plated resin component is roughly ground by means of the rough grinder in the rough grinding process, whereby roughly-ground fragments are prepared. These fragments are blown by the inflation method in the blowing process 2s, whereupon a blown form, which is composed of a base resin and deposit pieces therein, is obtained. Then, the blown form is rolled and drawn into a rolled film by means of the rolling/drawing unit 3 or 6 in the rolling/drawing process 3s, and the rolled form is pulverized by means of the pulverizer 4 in the pulverizing process 4s to prepare pulverized powder. The pulverized powder is cleared of a deposit constituting portion by the separator 5 in the separating process 5s, and is pelletized in the pelletizing process 6s. Thus, a recycled product can be obtained in the product finishing process 7s.

Figure 10:
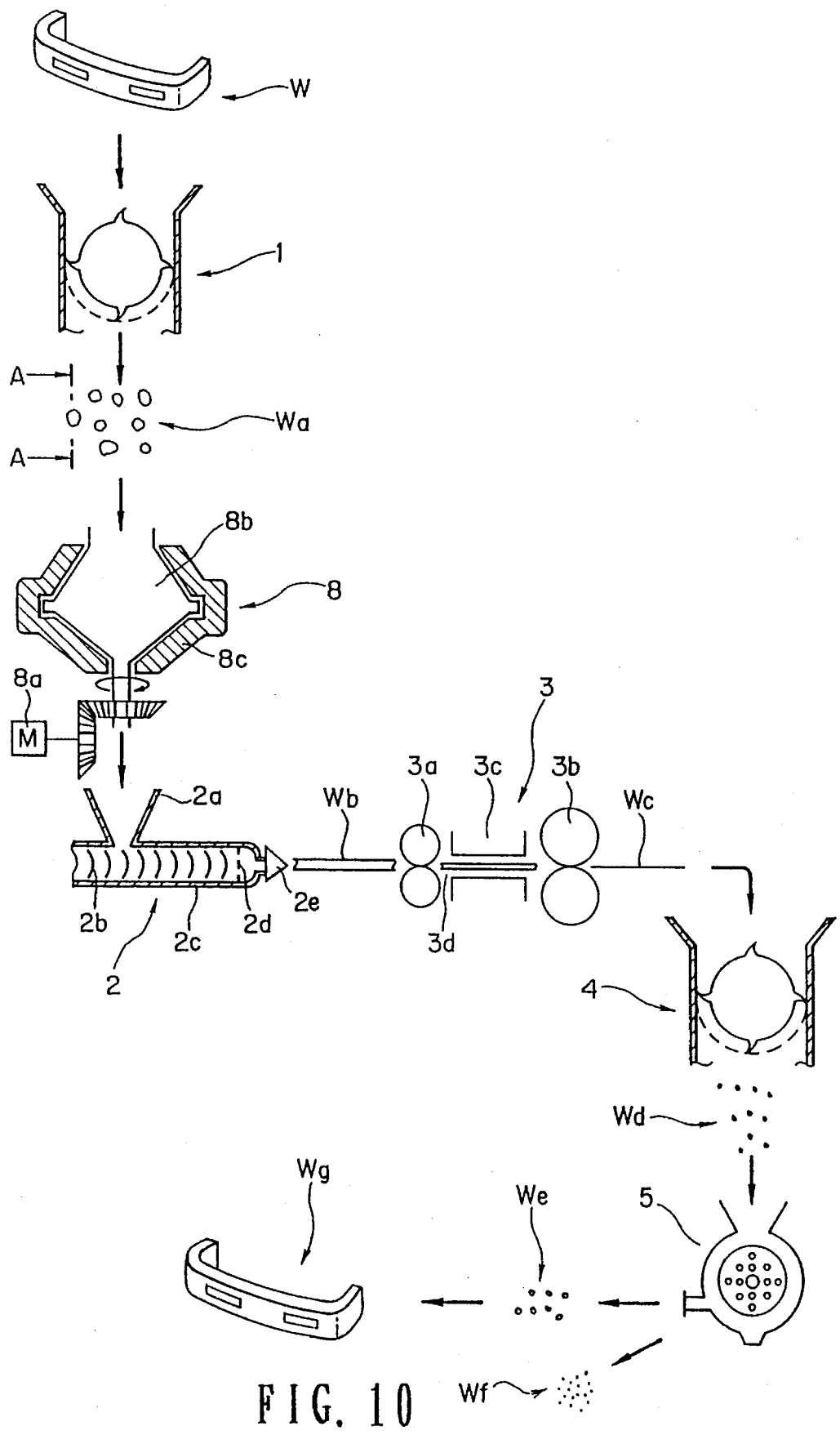
FIG. 10 is a schematic view for illustrating the resin component recycling method and apparatus according to a third embodiment of the invention.
Figure 11:
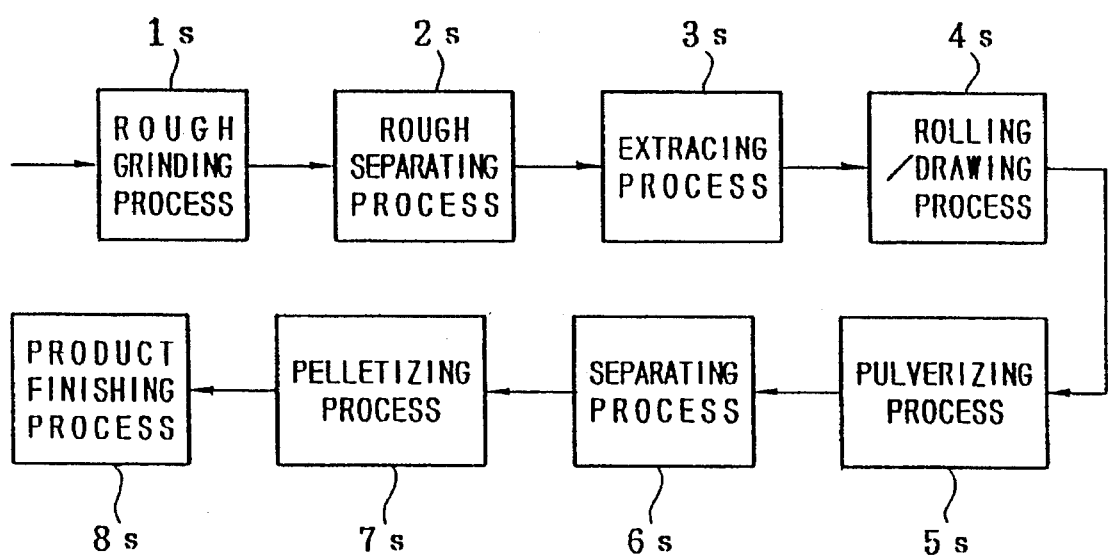
FIG. 11 is a flow chart showing the various processes of the method shown in FIG. 10.

FIG. 10 is a schematic view for illustrating the resin component recycling method and apparatus according to a third embodiment of the present invention, and FIG. 11 is a flow chart showing various processes of this method. In connection with the third embodiment, a description of the same arrangements and functions as in the first and second embodiments is omitted.

Roughly-ground fragments Wa prepared by means of a rough grinder 1 are supplied to a rough separator 8. As shown in FIG. 10, for example, the separator 8 may be a centrifugal separator which comprises a bead-shaped container 8b, which is rotated by a drive unit 8a, and a heater 8c. In this separator 8, a thermoplastic base or base resin of the fragments Wa in the container 8b is fused by the heater 8c, and the container 8b is rotated so that the base resin is centrifugally separated from thermoplastic resin film pieces, which are relatively large in size, by taking advantage of the difference between the respective specific gravities of the base resin and the film pieces.

The other elements are arranged in the same manner as in the first embodiment.

Referring now to the flow chart of FIG. 11, the resin component recycling method, which uses the recycling apparatus constructed in this manner, will be described.

The roughly-ground fragments Wa, prepared by means of the rough grinder 1 in a rough grinding process 1s, are thrown into the container 8b of the rough separator 8, e.g., the centrifugal separator shown in FIG. 10, in a rough separation process 2s. A thermoplastic base resin is fused by a heater 8c, and the container 8b is rotated by a drive unit 8a. Thus, thermosetting resin coating film pieces are separated or removed from the base resin, whereupon roughly-ground fragments are obtained.

The other processes are executed in the same manner as in the first embodiment.

Figure 12:
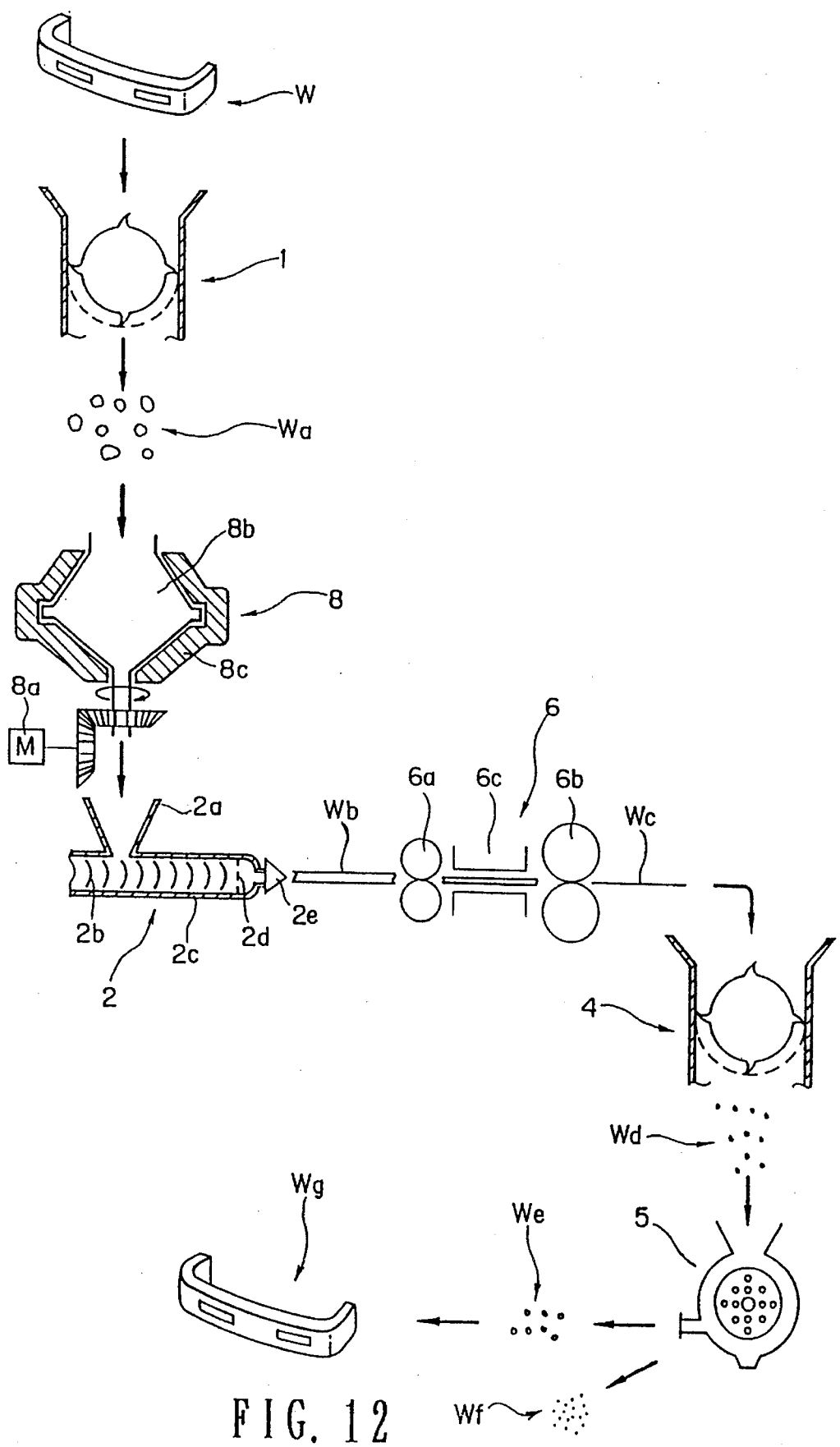
FIG. 12 is a schematic view for illustrating the resin component recycling method and apparatus according to the modification of the third embodiment of the invention.

FIG. 12 is a schematic view showing an outline of a modification of the third embodiment. Same reference numerals refer to the same portions in FIGS. 10 and 12, and a detailed description of those portions is omitted. In FIG. 12, numeral 6 denotes a rolling/drawing unit which prepares a rolled film Wc by rolling and drawing an extruded strand or film Wb extruded by means of an extruder 2.

This rolling/drawing unit 6 is constructed in the same manner as the modification of the first embodiment.

Figure 13:
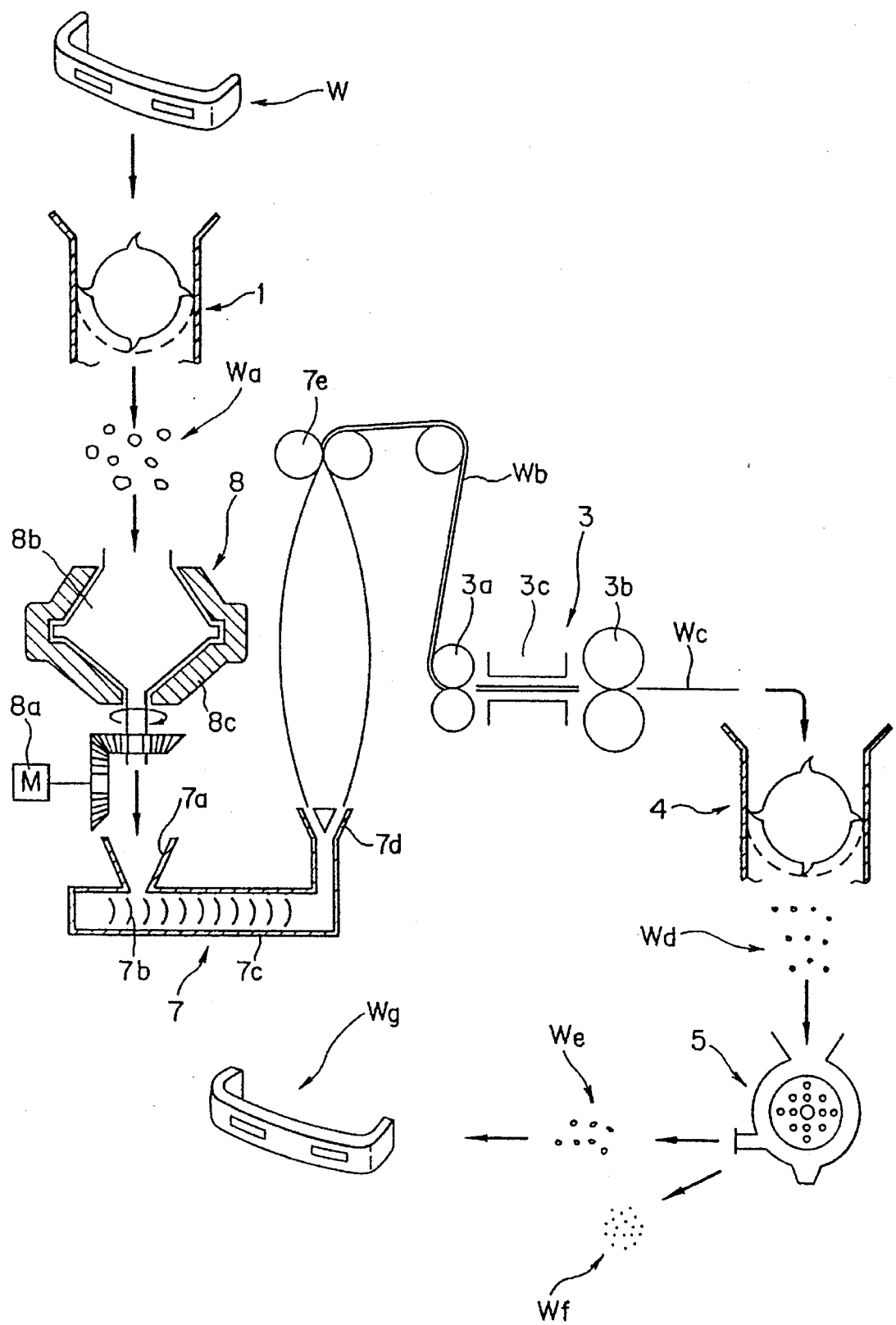
FIG. 13 is a schematic view for illustrating the resin component recycling method and apparatus according to a fourth embodiment of the invention.
Figure 14:
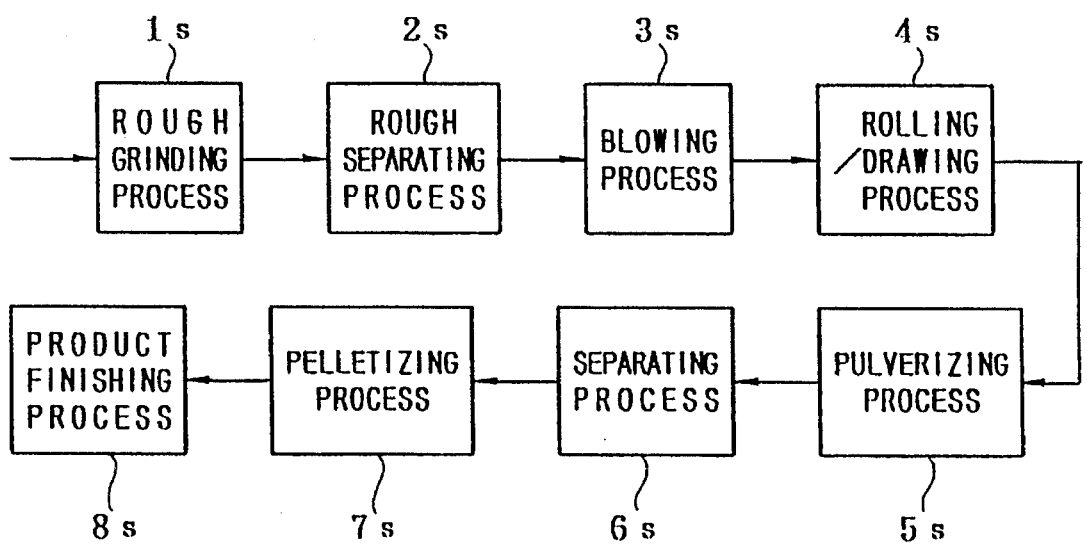
FIG. 14 is a flow chart showing the various processes of the method shown in FIG. 13.

FIG. 13 is a schematic view for illustrating a resin component recycling method and apparatus according to a fourth embodiment of the present invention, and FIG. 14 is a flow chart showing various processes of this method.

The same reference numerals refer to the same portions in FIGS. 10, 11 and 13, and a detailed description of those portions is omitted. In FIG. 13, numeral 7 denotes a blower which is used in a blowing process 9s subsequent to a rough separation process 2s, and prepares a blown tube Wh by the inflation method, using a roughly-separated form obtained by means of the rough separator 8 as a material.

The blower 7 is arranged so that roughly-ground fragments in a hopper 7a are advanced by rotating a screw 7b, and are heated by means of a band heater or the like. As they advance in the barrel 7c, the roughly-ground fragments Wa are softened and blended, and a thin-walled tube is extruded through an inflation die 7d, such as a crosshead die. The tube is inflated like a balloon to a predetermined degree with a gas, e.g., air, with its upper end held between pinch rollers 7e. As the rollers 7e are rotated in this state., the blown tube Wh is produced continuously.

In a rolling/drawing process 9s in the next stage, the blown form Wh, previously drawn thin enough in the blowing process 2s, is rolled in the same manner as in the foregoing embodiments.

Figure 15:
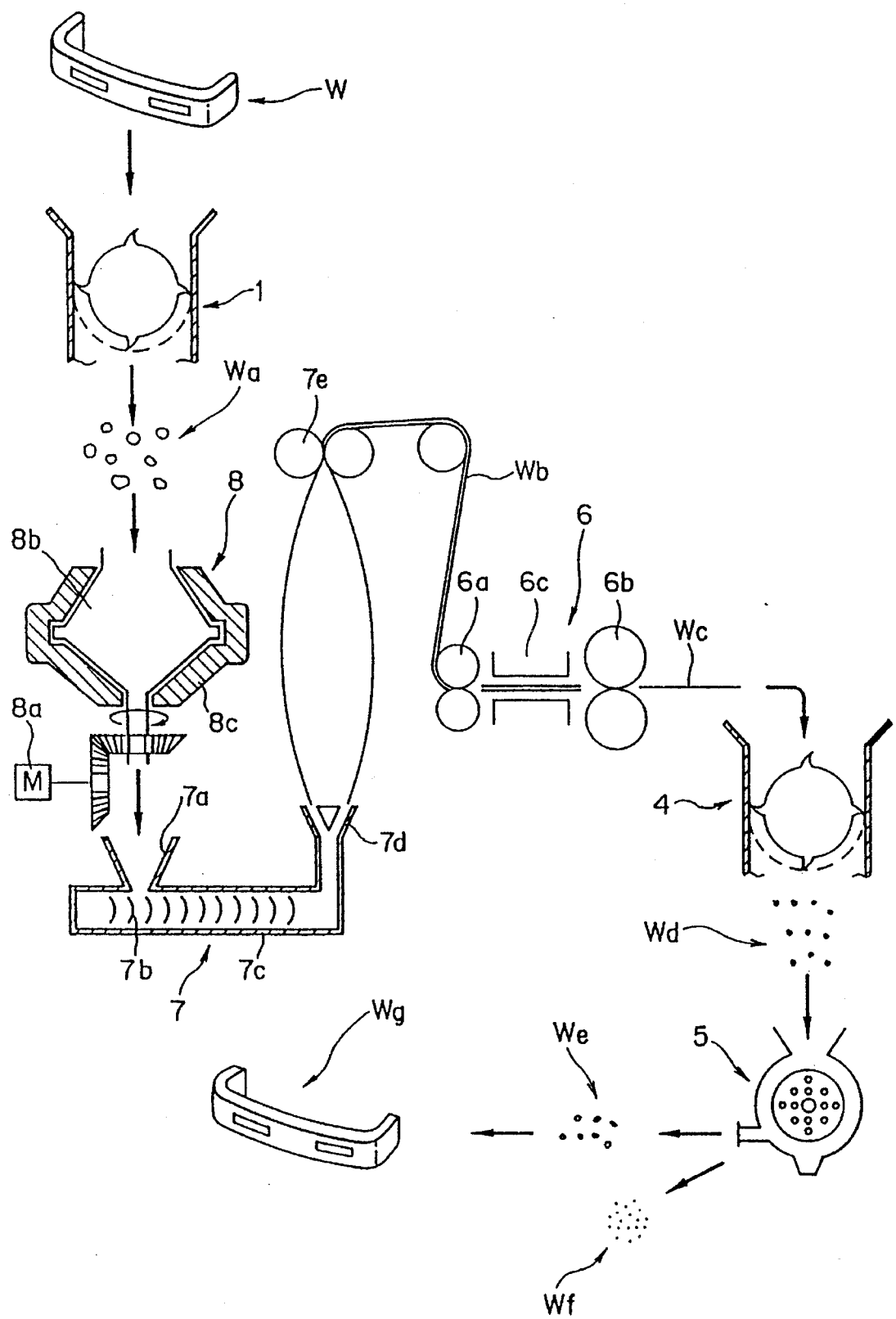
FIG. 15 is a schematic view for illustrating the resin component recycling method and apparatus according to the modification of the fourth embodiment of the invention.

FIG. 15 is a schematic view showing an outline of a modification of the fourth embodiment. The same reference numerals refer to the same portions in FIGS. 13 and 15, and the detailed description of those portions is omitted. According to this modification, as in the foregoing embodiments, the blowing process 9s and the blower 7 may be used in place of the extruding process 3s and the extruder 2 shown in FIGS. 11 and 10, respectively.

According to the arrangement described above, the extruded form Wb or the blown form Wh is heated or cooled as it is drawn in a rolling/drawing process 4s. Alternatively, however, the apparatus and control may be simplified by omitting the heating or cooling operation.

Although the case of recovering and recycling the coated resin bumper has been described above, moreover, the method and apparatus of the present invention are not limited to this product, and may be also applied to any other suitable resin products, such as thermoplastic resin products coated with a thermosetting resin or plated ones.

More specifically, a plated resin component is roughly ground by means of the rough grinder in the rough grinding process, whereby roughly-ground fragments are prepared. These fragments are separated and removed by means of the rough separator 8 in the rough separation process 2s, and the resulting roughly-separated form is heated and extruded by the extruder 2 in the extruding process 3s in the next stage. Thereupon, an extruded strand or film, which is composed of a base resin and deposit pieces therein, is obtained. Alternatively, the separated form is blown by the blower 7 in the blowing process 9s, whereupon a blown form is prepared. Then, the extruded or blown form is rolled and drawn into a rolled film by the rolling/drawing unit 3 in the rolling/drawing process 4s, and the rolled form is pulverized by the pulverizer 4 in a pulverizing process 5s to prepare pulverized powder. The pulverized powder is cleared of a deposit constituting portion by means of the separator separating process 6s, and is pelletized in a pelletizing process 7s. Thus, a recycled product can be obtained in the product finishing process 8s.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method for recycling of a resin component having a finished surface said resin component being formed of a thermoplastic base resin having a film coating or deposit of a different resin thereon, comprising:

rough grinding said resin component without removing said finished surface, to thereby prepare a roughly-ground form of said resin component;

heating and extruding the roughly-ground form by means of an extruder, to thereby prepare an extruded form of said resin component;

rolling and drawing the extruded form, with heating to a temperature lower than the melting point of the thermoplastic base resin, to thereby prepare a rolled film;

pulverizing the rolled film, to thereby prepare a pulverized form; and separating the pulverized form into a thermoplastic base resin and said different resin.

2. The resin component recycling method according to claim 1, wherein:

said different resin is a thermosetting resin.

3. The resin component recycling method according to claim 1, further comprising:

heating said roughly-ground form and separating and removing at least one of rough coating film pieces and rough deposit pieces from the roughly-ground form with a base resin fused, thereby preparing a molten form supplied to the extruder.

4. A method for recycling of a resin component having a finished surface, said resin component being formed of a thermoplastic base resin having a film coating or deposit of a different resin thereon, comprising:

rough grinding said resin component to thereby prepare a roughly-ground form of said resin component;

blowing the roughly-ground form by an inflation method, thereby preparing a blown tube composed of said base resin and said different resin;

rolling and drawing the blown form, to thereby prepare a rolled film;

pulverizing the rolled film, to thereby prepare a pulverized form; and separating the pulverized form into a base resin component and said different resin.

5. The resin component recycling method according to claim 4, wherein:

said blown form is heated to plasticize the base resin in the rolling/drawing step.

6. The resin component recycling method according to claim 4, further comprising the step of:

heating the roughly-ground form and separating and removing at least one of rough coating film pieces and rough deposit pieces from the roughly-ground form with a base resin fused, thereby preparing a molten form supplied to the blowing step.

7. A recycling apparatus for recycling of a resin component having a finished surface, said resin component being formed of a thermoplastic base resin having a film coating or deposit of a different resin thereon, comprising:

rough grinding means for rough grinding said resin component without removing said finished surface, thereby preparing a roughly-ground form of said resin component;

extruding means for heating and extruding said roughly-ground form, to thereby prepare an extruded form of said resin component rolling/drawing means for rolling and drawing the extruded form including heating means for heating the extruded form to plasticize the base resin, thereby preparing a rolled film;

pulverizing means for pulverizing the rolled film, to thereby prepare a pulverized form; and separating means for separating the pulverized form into a base resin component and at least one of a coating film and a deposit piece component.

8. The resin component recycling apparatus according to claim 7, further comprising:

rough separation means for heating the roughly-ground form and separating and removing at least one of rough coating film pieces and rough deposit pieces from the roughly-ground form with a base resin fused, thereby preparing a molten form supplied to said extruding means.

9. A recycling apparatus for recycling of a resin component having a finished surface thereof, said resin component being formed of a thermoplastic base resin having a film coating or deposit of a different resin thereon, comprising:

rough grinding means for rough grinding said resin component without removing said finished surface, thereby preparing a roughly-ground form of said resin component;

blowing means for blowing the roughly-ground form by inflation, to thereby prepare a blown tube composed of a base resin and coating at least one of film pieces and deposit pieces therein;

rolling/drawing means for rolling and drawing the blown form, to thereby prepare a rolled film;

pulverizing means for pulverizing the rolled film, to thereby prepare a pulverized form; and separating means for dividing the pulverized form into a base resin component and at least one of a coating film and a deposit piece component.

10. The resin component recycling apparatus according to claim 9, wherein:

said rolling/drawing means includes heating means for heating the blown form to plasticize the base resin.

11. The resin component recycling apparatus according to claim 9, further comprising:

rough separation means for heating the roughly-ground form and separating and removing at least one of rough coating film pieces and rough deposit pieces from the roughly-ground form with a base resin fused, thereby preparing a molten form supplied to the blowing means.

* * * * *